United States Patent [19]

Polan

[11] Patent Number: 4,854,342
[45] Date of Patent: Aug. 8, 1989

[54] CLAPPER SEAL FOR DRY PIPE VALVE
[75] Inventor: George S. Polan, Harleysville, Pa.
[73] Assignee: Central Sprinkler Corporation, Lansdale, Pa.
[21] Appl. No.: 244,208
[22] Filed: Sep. 14, 1988
[51] Int. Cl.⁴ .............................................. F16K 15/03
[52] U.S. Cl. ............................. 137/516.29; 137/527; 251/316
[58] Field of Search .............. 137/516.29, 527, 527.8; 251/328, 314, 316

[56] References Cited
U.S. PATENT DOCUMENTS

| | | | |
|---|---|---|---|
| 3,058,487 | 10/1962 | Helling et al. | 137/516.29 X |
| 3,295,547 | 1/1967 | Scaramucci | 137/516.29 X |
| 4,090,529 | 5/1978 | Schuller et al. | 137/516.29 |

Primary Examiner—John Fox
Attorney, Agent, or Firm—Panitch Schwarze Jacobs and Nadel

[57] ABSTRACT

A clapper seal for a dry pipe valve wherein a disc-shaped, resilient, compressible sealing gasket is secured to the clapper valve body by an annular, metallic washer. The washer is disposed between inner and outer sealing rings or beads formed on the underside of the gasket. The sealing rings are generally circular and cross-section, thereby minimizing surface contact with the air and water ring seats. The axial thickness and radial dimension of the washer are such that the washer contacts the air and water rings creating a metal-to-metal seal, and preventing further deformation of the sealing rings, upon over-compression or long-term compressive set of the gasket.

9 Claims, 2 Drawing Sheets

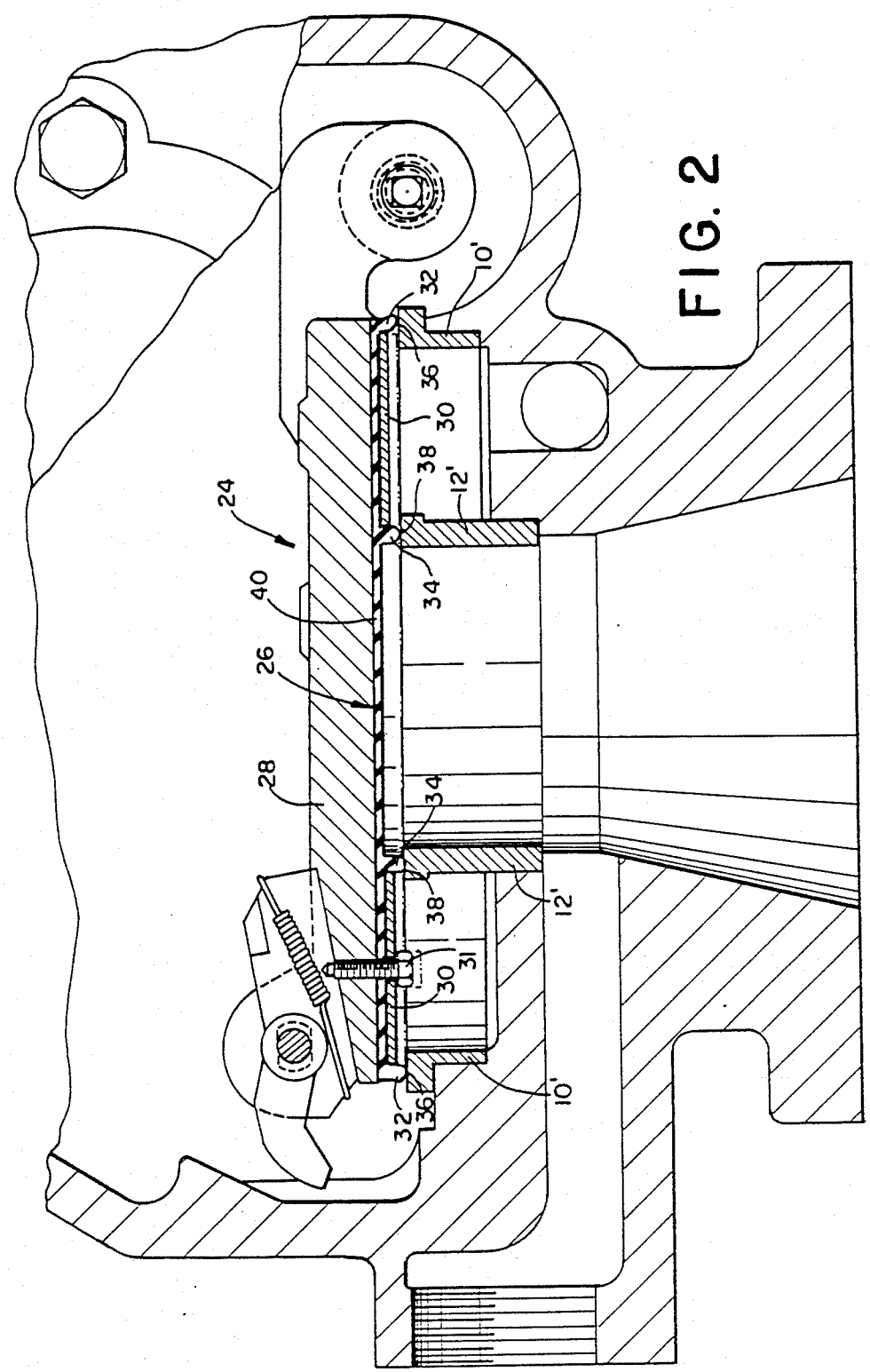

4,854,342

CLAPPER SEAL FOR DRY PIPE VALVE

FIELD OF THE INVENTION

The field of the present invention is fire protection equipment, more particularly valves for "dry" sprinkler systems.

BACKGROUND OF THE INVENTION

Depending on the nature of a sprinkler system and the environment it is designed to protect, the system valve may be any of the following types: alarm valve ("wet" system), deluge valve ("wet" or "dry" systems), check valve (one-way valve), dry valve ("dry" system), dry differential valve ("dry" system), gate valve and butterfly valve. The present invention is directed to a clapper seal for a dry valve.

The model "H" dry pipe valve manufactured by Central Sprinkler Corporation has a clapper differential of approximately six to one. By clapper differential is meant the ratio of air seal area to water seal area. When the system air pressure drops to approximately 1/6 the water pressure at the inlet port, then, the water supply pressure lifts the clapper valve. When the clapper valve lifts, it allows water to flow into the sprinkler system piping. Details of the model "H" dry pipe valve are available in Central Sprinkler Corporation bulletin DPV-H-4-6 (Rev. No. 2).

Conventionally, the clapper valve is sealed by an annular gasket or facing, made of resilient rubber. The gasket is secured to the clapper valve by a rigid, annular metallic washer or plate and a plurality of retaining bolts. The gasket radially bridges an annular gap between an air ring and a water ring located inside the valve housing. The air ring and water ring are cylindrical sleeves which separate the water and air sides of the valve. The metallic washer is disposed within the annular gap between the air ring and water ring. The clapper valve body is provided with a centering hub which plugs the water ring.

Under certain system conditions, the conventional seal design permits water penetration or seepage from the water supply side (inside the water ring) to the air or sprinkler system side (outside the air ring). Seepage tends to occur around the centering hub, at the central opening of the rubber gasket, and across the interface between the clapper valve body and rubber gasket. The seepage rate is low so that the condition may not be sensed by (built-in) valve detector switches. Water seeping through the seal tends to "column" or flow upwards into the sprinkler system piping. Since "dry" systems are normally required in areas subject to freezing conditions, this undetected water seepage poses serious problems, namely, danger of pipe freeze-up and catastrophic rupture. As an example of the potential severity of the problem, a six inch diameter pipe, at 100 psi water pressure, could dump approximately 800 pounds of water per minute if fully fractured.

A further shortcoming of the conventional seal design is long-term deformation of the rubber gasket at the zones of contact with the air and water rings. Most sprinkler systems encounter pressure surges on the water supply side. The rubber gasket, due to its pliable nature, is therefore subjected to compressive forces of varying magnitudes. The peripheral edge portions of the rubber gasket, at the contact areas with the air and water rings are subjected to over-compression or long-term compressive set. These portions of the rubber gasket tend to become over-stressed and brittle, and they may eventually fail.

The present invention is directed to a solution to the foregoing problems. The invention is a clapper seal for a dry pipe valve wherein over-compression or long-term compressive set of the sealing gasket is limited at the areas of contact with the air and water rings and wherein water seepage and excessive deformation of the sealing gasket are essentially eliminated. The water ring is capped by a disc-shaped sealing gasket so that water seepage at the interface between the clapper valve body and the gasket is impossible.

SUMMARY OF THE INVENTION

The invention is a clapper seal for a dry pipe valve having a clapper valve body, an air ring having a seat portion, and a water ring having a seat portion and disposed radially inwardly of the air ring. The clapper seal includes a resilient compressible gasket secured to the clapper valve body. The gasket has an outer sealing ring or bead in sealing contact with the air ring seat portion and an inner sealing ring or bead in sealing contact with the water ring seat portion. An annular retaining plate is disposed between the inner and outer gasket sealing rings. The gasket is secured to the clapper valve body by the retaining plate and plural retaining bolts. The retaining plate has a radial dimension and an axial thickness such that the retaining plate travels into contact with the air ring and water ring to seal the air ring and water ring upon over-compression or long-term deformation of the gasket sealing rings. Excessive deformation and water seepage are substantially eliminated.

For the purpose of illustrating the invention, there is shown in the drawings a form which is presently preferred; it being understood, however, that this invention is not limited to the precise arrangements and instrumentalities shown.

BRIEF DESCRIPTION OF THE DRAWINGS

FIG. 2 is a section in elevation of the clapper seal for a dry pipe valve of the present invention.

DETAILED DESCRIPTION OF THE PREFERRED EMBODIMENT

Figure 1:
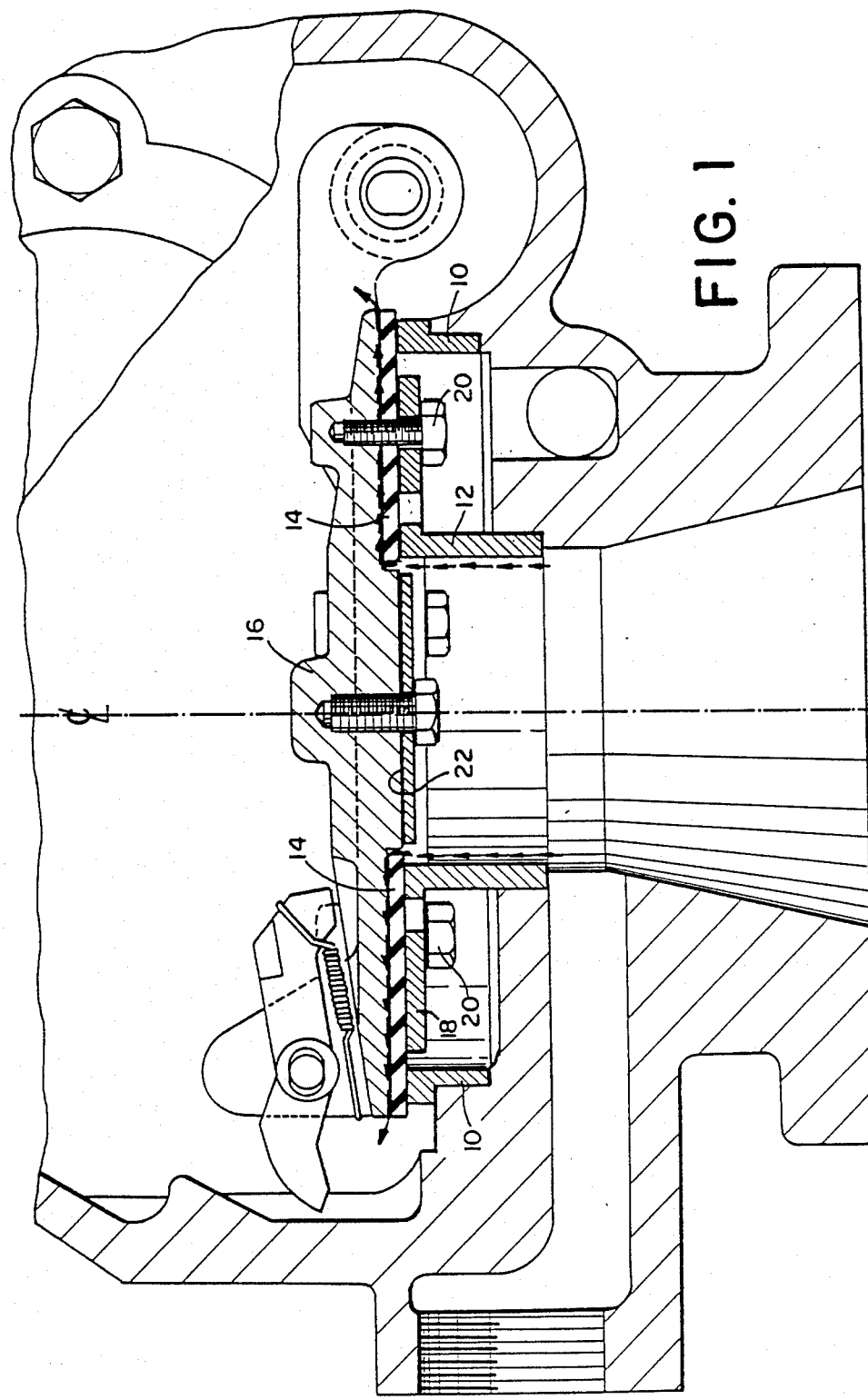
FIG. 1 is a section in elevation of the prior art clapper seal for a dry pipe valve.

Referring to the drawings, wherein like numerals indicate like elements, there is shown in FIG. 1 a prior art clapper seal for a dry pipe valve. The dry pipe valve includes a metallic air ring or sleeve 10 on the air or sprinkler system side of the valve and a metallic water ring or sleeve 12 on the water supply side of the valve. All parts shown in FIG. 1 are symmetrical about the valve center line. The water ring 12 is disposed radially inwardly of the air ring 10, the air and water rings being co-axially aligned about the valve center line.

An annular resilient compressible gasket or facing 14, made of a rubber material, is secured to the clapper valve body 16 by an annular washer or retaining plate 18, made of a metallic material, and a plurality of retaining bolts 20. The gasket 14 radially bridges the annular gap between air ring 10 and water ring 12. The radial dimension of the gasket is such that the peripheral edge portions of the gasket protrude beyond the areas of contact of the gasket with the air ring and water ring seats.

As shown in FIG. 1, the conventional clapper valve body includes a centrally disposed, generally cylindrical-shaped hub 22 which interfaces with the inner peripheral edge of gasket 14 to plug the water ring 12. Under certain system conditions, however, this clapper seal design permits water penetration or seepage (indicated by the stream of arrows in FIG. 1) from the water supply side through the interface between clapper valve body 16 and gasket 14 to the sprinkler system side of the seal. In addition, pressure surges on the water supply side subject the peripheral edge portions of gasket 14 to compressive forces whereby the peripheral edge portions of the gasket are subjected to over-compression or long-term compressive set. As a result, these portions of the gasket may become over-stressed and brittle, and they may eventually fail.

Referring to FIG. 2, there is shown a clapper seal 24 for a dry pipe valve according to the present invention. A unitary, disc-shaped gasket 26 is secured to the clapper valve body 28 by an annular washer or plate 30 and retaining bolts 31 (only one of which is shown). The gasket 26 is made of a resilient compressible material, preferably Buna-N, 75-80 durometer, Apex compound #5214 or equivalent, although the particular type or composition of material is not limiting. The washer 30 is preferably made of a rigid, metallic material. The gasket 26 is provided with an outer, depending sealing ring or bead 32 and an inner, depending sealing ring or bead 34.

Preferably, the axial thickness or height of washer 30 is approximately 30 percent less than the axial thickness or height of the gasket 26 (at ring 32 and ring 34). The axial thickness of gasket 26 and washer 30, then, are such that the washer is spaced in elevation above seat portion 36 of air ring 10' and seat portion 38 of water ring 12'. Over-compression or long term compressive set of gasket 26 due to water pressure surges reduces the axial thickness or height of gasket sealing rings 32, 34, whereby the washer 30 drops into sealing contact with seat portions 36, 38 of rings 10', 12'. The washer thereby seals the air ring and water ring by a metal-to-metal contact while preventing further or excessive deformation of the gasket sealing rings.

Referring to FIG. 2, the inner diameter ("I.D.") of the washer 30 at gasket ring 34 is less than the outer diameter ("O.D.") of the water ring at seat portion 38 whereby the washer 30 can seat on the water ring as previously described. Similarly, the O.D. of washer 30 at gasket ring 32 is more than the O.D. of the air ring at seat portion 36 whereby the washer can seat on the air ring seat portion as previously described. In other words, in the present invention, the radial dimension of the washer 30 is such that the washer radially bridges the annular gap between the air ring and water ring to ensure the metal-to-metal seal and to prevent further deformation of the gasket sealing rings. Water seepage and excessive deformation, hence degradation, of the gasket 26 are thereby eliminated.

In addition, as can be seen from FIG. 2, gasket sealing ring 34 and the central portion 40 of gasket 26 define a cup-type seal in contact with the water ring seat portion 38. Similarly, gasket sealing ring 32 forms a cup-type seal on contact with air ring seat portion 36. The gasket sealing rings are generally circular in cross-section thereby minimizing surface contact with the air and water ring seat portions.

The present invention may be embodied in other specific forms without departing from the spirit or essential attributes thereof and, accordingly, reference should be made to the appended claims, rather than to the foregoing specification, as indicating the scope of the invention.

I claim:

1. Clapper seal for a pipe valve having a clapper valve body, an air ring, and a water ring disposed radially inwardly of said air ring, comprising:
    an annular retaining plate,
    a resilient compressible gasket disposed between said clapper valve body and said retaining plate,
    said compressible gasket having an outer, depending sealing ring in sealing contact with said air ring when said valve body is in a closed position and an inner, depending sealing ring in sealing contact with said water ring when said valve body is in said closed position
    said retaining plate being disposed between said inner and outer sealing rings and secured with said gasket to said compressible gasket and clapper valve body,
    said retaining plate having a radial dimension and axial thickness such that said retaining plate travels into contact with said air ring and said water ring upon axial compression of said gasket sealing rings.

2. Clapper seal for a pipe valve having a clapper valve body, an air ring having a seat portion, and a water ring having a seat portion and disposed radially inwardly of said air ring, comprising:
    an annular retaining plate having an I.D. and an O.D., the I.D. of said retaining plate being less than the O.D. of said water ring at the seat portion thereof and the O.D. of said retaining plate being greater than the I.D. of said air ring at the seat portion thereof,
    a generally disc-shaped resilient compressible gasket disposed between said clapper valve body and said retaining plate,
    said compressible gasket having an outer, depending sealing ring in sealing contact with said air ring seat portion when said valve body is in a closed position and an inner, depending sealing ring in sealing contact with said water ring seat portion when said valve body is in said closed position,
    said retaining plate being disposed between said inner and outer sealing ring and secured with said gasket to said clapper valve body such that said retaining plate is spaced in elevation above said air ring seat portion and said water ring seat portion whereby said retaining plate travels into contact with said air ring seat portion and said water ring seat portion upon axial compression of said gasket sealing rings.

3. Clapper seal for a pipe valve having a clapper valve body, an air ring having a seat portion, and a water ring having a seat portion and disposed radially inwardly of said air ring, comprising:
    a disc-shaped resilient compressible gasket secured to said clapper valve body so as to cap said air ring and water ring when said clapper valve body is in a closed position, said gasket having an outer sealing ring depending therefrom and in sealing contact with said air ring seat portion when said clapper valve body is in said closed position, and an inner sealing ring depending thererfrom and in sealing contact with said water ring seal seat portion when said clapper valve body is in said closed position.

4. Clapper seal according to claim 3 including an annular retaining plate disposed between said inner and outer gasket sealing rings and secured with said gasket to said clapper valve body, said retaining plate having a radial dimension and axial thickness such that said retaining plate travels into contact with said air ring and water ring to seal said air ring and water ring upon axial compression of said gasket sealing rings.

5. Clapper seal according to any one of claims 1, 2 and 4 wherein said retaining plate has an axial thickness which is approximately thirty percent less than the axial thickness of each of said gasket sealing rings.

6. Clapper seal according to any one of claims 1, 2 and 4 wherein said retaining plate, air ring and water ring are metallic whereby said retaining plate seals said air ring and water ring by a metal-to-metal contact.

7. Clapper seal according to any one of claims 1, 2 and 3 wherein said inner gasket sealing ring forms a cup-type seal at said water ring seal seat portion when said clapper valve body is in said closed position.

8. Clapper seal according to any one of claims 1, 2 and 4 including one or more bolt fasteners securing said retaining plate with said gasket to said clapper valve body.

9. Clapper seal according to any one of claims 1, 2 and 3 wherein the cross-section of each sealing ring is such that the surface contact of the sealing ring with a ring seat portion is minimized.

* * * * *